May 9, 1967     P. J. C. KAASENBROOD     3,318,951
PREPARATION OF UREA WITH A LOW BIURET CONTENT
Filed April 8, 1964
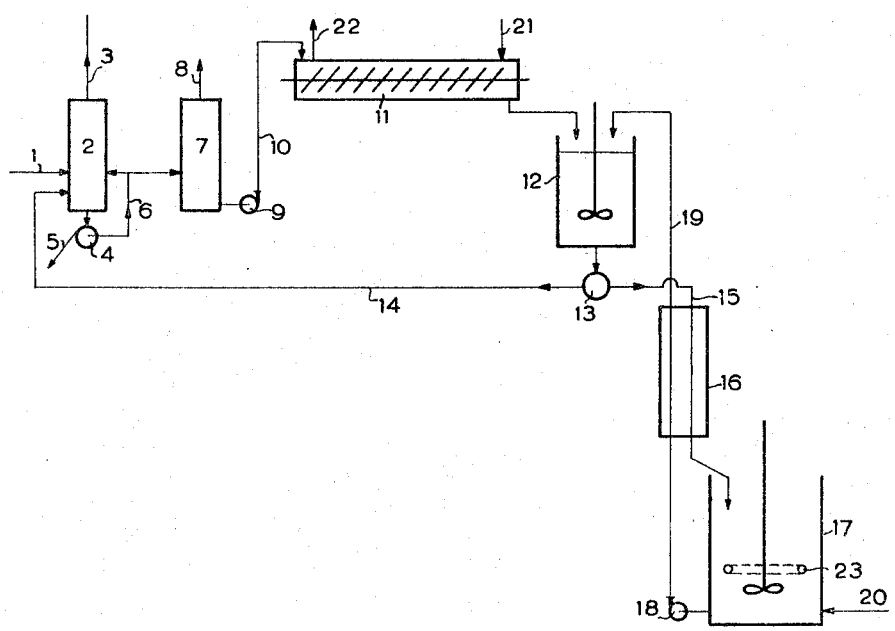
Inventor
Petrus J. C. Kaasenbrood
By Cushman, Darby & Cushman
Attorneys 3,318,951
PREPARATION OF UREA WITH A LOW BIURET CONTENT
Petrus J. C. Kaasenbrood, Sittard, Netherlands, assignor to Stamicarbon N.V., Heerlen, Netherlands
Filed Apr. 8, 1964, Ser. No. 358,170
Claims priority, application Netherlands, Apr. 11, 1963, 291,528
3 Claims. (Cl. 260—555)

The present invention relates to the preparation of urea with a low biuret content.

It is known that a small amount of biuret is invariably formed in the synthesis of urea. Thus, after the removal of ammonium carbamate which has not been converted to urea, the urea solution resulting from the synthesis and containing about 75% by weight of urea, also usually contains about 0.5 to 2% by weight of biuret.

Urea to be used as nitrogen fertilizer, should contain no more than 1% by weight of biuret as the latter has a more or less toxic effect on all sorts of plants. Additionally, in the processing of urea to urea formaldehyde resins, a biuret content of even less than 1% by weight may produce an undesired turbidity in the end product.

In view of the above, there is a rapidly growing demand for urea with a low biuret content, e.g. urea containing 0.3% by weight or less of biuret. One conventional method of preparing urea with such a low biuret content involves crystallizing the urea from a urea solution contaminated with biuret. This operation yields crystalline urea with a sufficiently low biuret content on the one hand, and on the other hand, urea-containing mother liquors with a high biuret content of, for instance, 9–15% by weight. However, the processing of these mother liquors is not simple and represents a serious drawback to this particular method.

It has also been previously suggested to isolate biuret from mother liquors of the type referred to above by dilution and crystallization. In this way, biuret is obtained as a by-product along with urea. However, the demand for biuret, which may be used, for example, as a blowing agent in the foam rubber and foam plastics industry, is not particularly great. Hence, this method of processing the biuret-containing mother liquor is not attractive at the present time.

Another known method of processing biuret-containing mother liquor involves treating the same in such a way that a large part of the biuret is converted to urea according to the reaction equation $$NH_2CONHCONH_2 + NH_3 \rightarrow 2CO(NH_2)_2$$

This method requires the use of separate, pressure-resistant equipment since ammonia pressures of at least 20 atm., and preferably much higher are required to achieve a reasonably rapid conversion. Because of this, it has also been suggested that, instead of being kept at the required temperature and ammonia pressure in a special pressure vessel, the biuret-containing mother liquor might be fed to the urea synthesis stage or to a pressure stage of the recirculation system for $NH_3$ and $CO_2$ formed in the carbamate decomposition. However, this method has the drawback that, due to the location of the ammonium carbamate⇌urea-water equilibrium, almost half of every kg. of urea contained in the mother liquor is converted to ammonium carbamate which has an adverse effect on the urea synthesis yield.

In view of the foregoing, the principal object of the invention is to provide an improved process for preparing urea with a low biuret content wherein urea is crystallized and separated from a biuret-containing urea solution and the resulting biuret-containing mother liquor is processed in such a way that the abovementioned disadvantages are obviated. Other objects will also be apparent from the following description.

Broadly stated, the present process involves first converting the mother liquor to a crystal mass consisting essentially of urea and biuret, thereafter mixing this crystal mass with such an amount of a recycling urea-biuret melt containing 15–28% by weight of biuret that the biuret crystals of the crystal mass are dissolved in the melt while the urea crystals remain behind, then separating the urea crystals from the melt, contacting the melt with gaseous ammonia at a temperature of 120–150° C., to convert the biuret dissolved from the urea-biuret crystal mass into urea, and then mixing the thus contacted melt with an additional amount of crystal mass consisting of urea and biuret.

In contrast to known procedures, the treatment of the melt with gaseous ammonia can be carried out at atmospheric pressure because the conversion takes place in a substantially water-free urea-biuret melt and not in an aqueous solution where the reaction $$CO(NH_2)_2 + H_2O \rightleftharpoons 2NH_3 + CO_2$$

also goes on continuously. However, there is no objection to using a higher pressure in this treatment although this does not offer any advantages over atmospheric pressure.

As indicated, the recycling urea-biuret melt, with which the urea-biuret crystal mass is mixed and in which the biuret crystals dissolve, has a biuret content ranging from 15 to 28% by weight. The lower limit of 15% is determined by the fact that, at one atmosphere ammonia pressure, the biuret content, at equilibrium in a urea-biuret melt having a temperature of 140° C., is about 15% by weight. The upper limit is determined by the fact that no solid biuret will dissolve in a melt containing more than 28% by weight of biuret, at the temperature reached after the melt has been mixed with the biuret-urea crystal mass. To promote rapid dissolving of the biuret crystals and keep the crystal suspension sufficiently fluid, the weight ratio between the urea-biuret crystal mass and the urea-biuret melt should not be much lower than 1:2.5. If a much larger amount of melt is used, an unnecessarily large amount of melt will be kept in circulation causing needless consumption of energy.

In contrast to the crystals separated from the original urea solution, the urea crystals separated from the melt are still comparatively rich in biuret because they are separated from a melt having a high biuret content and are not washed. In particular these, crystals contain approximately 1% by weight of biuret. This urea can be sold without further processing, or it may be fed back to the original urea solution that is to be crystallized. As compared with the total urea production, the amount of biuret-containing urea is so small that this feed-back does not present any problems.

The process of the invention is schematically illustrated in the attached drawing wherein urea solution from the urea synthesis and contaminated with, for example, 1–2% by weight of biuret, passes through conduit 1 to a vacuum crystallizer 2, from which water vapor is drawn off via conduit 3. The crystal suspension formed in the crystallizer 2 is supplied to centrifuge 4, where it is separated into crystalline urea which is poor in biuret, discharged from the system through conduit 5, and a biuret-containing mother liquor which is fed to the evaporator 7 through a conduit 6.

Water vapor is discharged from evaporator 7 through conduit 8, while the concentrated mother liquor passes via a pump 9 and conduit 10 to a screw crystallizer 11 where the mass crystallizes and the water still present is evaporated by the heat of crystallization. The crystal mass thus ormed is discharged into a mixed vessel 12 where it is mixed with a melt of urea and biuret having a biuret content of 15–28% by weight and supplied from melting vessel 17 via pump 18 and conduit 19. Virtually all biuret crystals in the crystal mass dissolve in the melt supplied to the vessel 12, the remaining mass being separated in centrifuge 13. The urea crystals thus separated off, with a biuret content of about 1%, may be discharged as such from centrifuge 13 or they may be recirculated to the vacuum crystallizer 2 via conduit 14. The melt separated off in centrifuge 13 and containing a high percentage of biuret, is fed back to the melting vessel 17 through conduit 15 and heat exchanger 16.

Ammonia is continuously supplied to the melt in melting vessel 17 by means of conduit 20. The temperature and the composition of the melt in the melting vessel are such that the ammonia vapor pressure is about 1 atmosphere and the biuret content is automatically kept constant. In other words, the additional amount of biuret supplied through conduit 15, i.e. the amount supplied through conduit 1 per unit time, is continously converted to urea.

The invention is further illustrated, but not limited, by the following example:

To prepare 100 tons/day of substantially biuret-free urea from a urea solution obtained from the urea synthesis and containing 0.6% by weight of biuret with respect to the urea content, 600 kg. of biuret per 24 hr., or 25 kg. of biuret per hour, must be removed. To this end, 278 kg./hr. of mother liquor (containing 185 kg. of urea, 25 kg. of biuret and 68 kg. of water) were passed through conduit 6 and supplied to evaporator 7 from which 46 kg./hr. of water were discharged in the form of water vapor. The concentrated solution (temperature 115° C.) was fed into screw crystallizer 11 and cooled there by means of a countercurrent flow of 180 m.$^3$ (n.t.p.) of air (temperature 20° C.), fed into the crystallizer at 21 and discharged at 22, and finally crystallized. The still hot crystal mass from crystallizer 11 with a temperature of 80° C., and consisting of a mixture of 185 kg./hr. of urea and 25 kg./hr. biuret, was fed to mixing vessel 12 to be mixed there with 480 kg./hr. of melt consisting substantially of urea (346 kg.), biuret (104 kg.) and cyanuric acid (25 kg.) from melting vessel 17. After mixing, the temperature was 112° C. The mass was centrifuged. 214 kg./hr. of urea crystal containing 1% by weight of biuret were separated off. In addition, 467 kg./hr. of a melt containing 319 kg. of urea, 127 kg. of biuret and 25 kg. of cyanuric acid, were obtained. This quantity was fed back to melting vessel 17 which contained about 200 kg. of melt at a temperature 135° C. to which 4 kg./hr. of $NH_3$ gas were supplied through conduit 20.

It will be recognized that various modifications may be made in the invention as described above. Thus, for example, the urea solution fed into crystallizer 2 from the urea synthesis will usually have a composition comprising, by weight, 70 to 77 parts urea, 0.5 to 2 parts biuret and 29 to 22 parts water of which 85 to 98% is usually removed in the crystallizer 2. The temperature in the crystallizer will usually be in the range of 50 to 70° C. and the pressure between about 50 to 100 mm. Hg.

The mother liquor remaining after removal of urea crystals by means of centrifuge 4 will usually comprise from 63 to 73 parts urea, 12 to 5 parts biuret and 20 to 30 parts water, by weight. Generally speaking, from 60 to 80% of the water in the mother liquor is removed in the evaporator 7 at a temperature within the range of 80 to 120° C. The resulting concentrated solution is then cooled in crystallizer 11. The crystallized mass is mixed in vessel 12 as aforesaid with melt from vessel 17 consisting essentially of 84 to 62 parts urea, 15 to 28 parts biuret and 1 to 10 parts cyanuric acid at a temperature in the range of 125 to 100° C. As noted above, the weight ratio of crystal mass and urea-biuret melt should not be significantly lower than 1:2.5 and usually will be in the range of 1:5 and 1:3. Additionally, from 0.5 to 2 parts $NH_3$ gas will normally be added per 100 parts of melt fed in vessel 17, using a temperature in the order of 120–150° C. as mentioned above.

The scope of the invention is defined in the following claims wherein—

I claim:
1. In a process for the preparation of urea having a low biuret content by passing an aqueous urea solution containing biuret into a first crystallization zone whereby urea is crystallized by evaporation of water from said solution and separating said crystallized urea from the remaining mother liquor of said solution, the improvement which comprises evaporating water from said remaining mother liquor in a second crystallization zone to convert the liquor to a substantially dry crystalline mass of urea and biuret, providing a urea-biuret melt containing about 15–28% by weight of biuret, mixing said crystalline mass of urea and biuret with said melt at a temperature near the melting point of the resulting mixture whereby biuret in said crystalline mass of urea and biuret is dissolved in said melt, separating said crystalline mass of urea from said melt, contacting the separated urea-biuret melt with ammonia gas at a temperature of 120°–150° C. to convert part of the biuret present in said urea-biuret melt to urea whereby the biuret content in said melt is adjusted to about 15–28% by weight and recycling said converted urea-biuret melt for further mixing with crystalline mass of urea and biuret.

2. The process of claim 1 wherein said separated crystalline mass of urea is recycled to said first crystallization zone.

3. The process of claim 1 wherein the weight ratio between said crystalline mass of urea and biuret and the urea-biuret melt is in the range of 1:2.5 to 1:5.

No references cited.

ALEX MAZEL, *Primary Examiner.*

HENRY R. JILES, *Examiner.*